March 21, 1939.     D. S. BENNETCH     2,151,415
HYDRAULIC TRANSMISSION
Filed May 31, 1935     3 Sheets-Sheet 1

INVENTOR:
DAVID S. BENNETCH
BY
ATTORNEYS

March 21, 1939.   D. S. BENNETCH   2,151,415
HYDRAULIC TRANSMISSION
Filed May 31, 1935   3 Sheets-Sheet 2

INVENTOR:
DAVID S. BENNETCH
BY
ATTORNEYS

March 21, 1939.   D. S. BENNETCH   2,151,415
HYDRAULIC TRANSMISSION
Filed May 31, 1935   3 Sheets-Sheet 3

INVENTOR:
DAVID S. BENNETCH,
BY Austin & Dix
ATTORNEYS

Patented Mar. 21, 1939

2,151,415

UNITED STATES PATENT OFFICE 2,151,415

HYDRAULIC TRANSMISSION

David S. Bennetch, Sheridan, Pa.

Application May 31, 1935, Serial No. 24,353

5 Claims. (Cl. 74—60)

The invention relates, in general, to variable speed transmissions and more particularly to variable speed transmissions of the hydraulic type.

The invention relates to variable speed transmission comprising a variable stroke pump unit driving a similar variable stroke motor unit, the pump unit being driven by a prime mover, such as an automobile engine and the motor unit driving the load, such as an automobile. Each unit may comprise a rotary cylinder block having a plurality of axially extending cylinders and cooperating with a tiltable swash plate. By tilting the swash plate, the stroke of the pistons in the cylinders may be varied between zero and maximum.

The rear or motor swash plate may be at full tilt and the forward or pump swash plate may be vertical when the load is stationary. This corresponds to "neutral" position in an automobile. To speed up the load, the forward swash plate is tipped gradually until it assumes a full tilt position at which a one to one speed ratio is obtained between driving and driven shafts. At this time, a suitable mechanical clutch may be engaged positively to connect the prime mover to the load and, if desired, provision may be made for tilting both swash plates back to erect positions after the mechanical clutch is engaged.

According to the invention, a stator may be interposed between the pump and motor blocks which may have arcuate shaped suction and pressure openings. The liquid circulating system may be closed in that the discharge from the pump unit is delivered directly through the stator to the inlet of the motor unit and the discharge of the motor unit is delivered directly through the stator to the suction side of the pump unit.

To prevent the entraining of air within the liquid within the transmission and to eliminate reduction of efficiency caused thereby, especially at high speeds, according to the invention an auxiliary liquid pump or supercharger is provided for feeding liquid under pressure to the transmission at all times. The auxiliary pump may be a simple gear type pump driven by the drive shaft or by the compressor unit and may pump oil from a suitable reservoir, for example, in the bottom of the transmission housing, into the suction opening of the stator, preferably midway between the ends thereof. A suitable relief valve may be provided in the discharge of the auxiliary pump to keep the pressure of the supercharger at a predetermined value.

If desired, the connecting rods of the pump and motor units may be hollow and a ball and socket bearing may be provided between each connecting rod and swash plate. The hollow connecting rod serves to put the ball and socket bearing under the same pressure as that exerted on the piston. This bearing may be so constructed that the effective area thereof is equal to the area of the piston, thus providing, in effect, a "full floating" connecting rod.

If desired, the drive shaft may be in the form of a sleeve in which a mechanical clutch of the dog toothed type may be incorporated. The driven shaft passes through the sleeve and is connected to one element of this clutch. The other element of the clutch is adjustable, for example, through axial slots in the drive sleeve.

The invention also consists in certain new and original features of construction and combinations of parts hereinafter set forth and claimed.

Although the novel features which are believed to be characteristic of this invention will be particularly pointed out in the claims appended hereto, the invention itself, as to its objects and advantages, and the manner in which it may be carried out, may be better understood by referring to the following description taken in connection with the accompanying drawings forming a part thereof, in which Fig. 1 is a horizontal section through the transmission;

Figure 1:
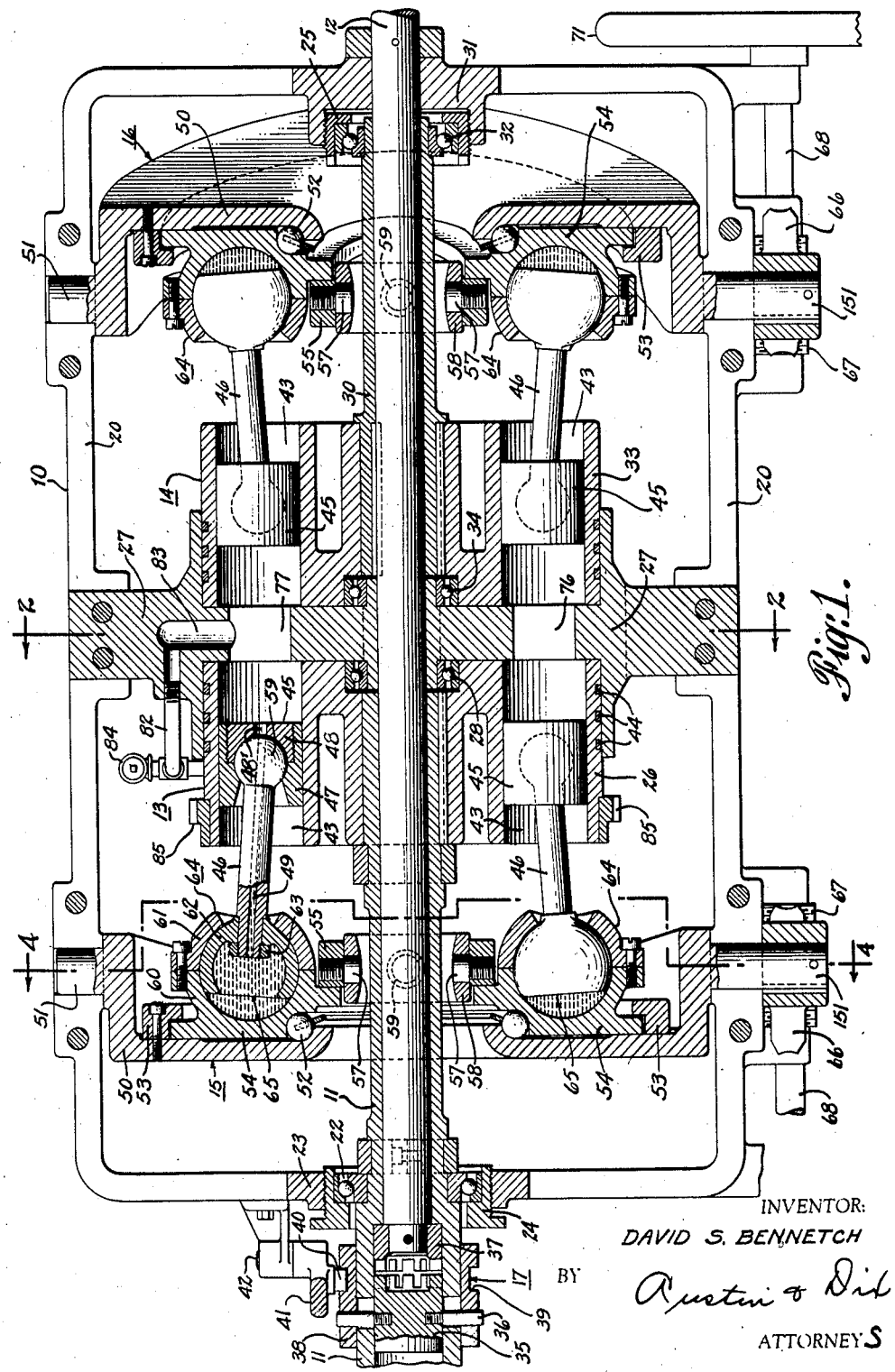

In the following description and in the claims, various details will be identified by specific names for convenience, but they are intended to be as generic in their application as the art will permit.

Like reference characters denote like parts in the several figures of the drawings.

In the drawings accompanying and forming part of this specification, certain specific disclosure of the invention is made for purposes of explanation, but it will be understood that the details may be modified in various respects without departure from the broad aspect of the invention.

Referring now to the drawings, the transmission, in general, comprises a casing 10, a drive shaft 11 and a driven shaft 12; and a pump un't 13 and a motor unit 14 having, respectively, the tiltable swash plate assemblies 15 and 16 to vary the stroke of the pistons. The transmission also includes the mechanical clutch 17, the supercharger 18 (Fig. 2) and the adjustments 41, 69 and 71 for adjusting the angle of the swash plate and the position of the mechanical clutch.

The drive shaft 11 is adapted to be connected to a prime mover, such as an automobile engine and the driven shaft 12 is connected to the load which, in the case of an automobile, may be the propeller shaft. The adjustments 41, 69 and 71 for adjusting the position of the swash plates and of the mechanical clutch are shown mainly to simplify the explanation of the invention, but in practice these adjustments will preferably be power driven, for example, by hydraulic cylinders and these cylinders will preferably be controlled automatically by either the speed of the engine or the torque applied to the load, or both.

The casing 10 comprises a heavy lower body 20 and a detachable cover 21 which, if desired, may be made of lighter material. All parts of the transmission are supported by the body 20, as will be understood from an inspection of the drawings.

The drive shaft 11 is shown in the form of a sleeve and is journalled in a ball bearing assembly 22 which is supported in a bearing housing 23 secured to the body 20. The drive shaft 11 is keyed to the pump block 26, the pump block being journalled to the stator 27 by the bearing assembly 28.

The driven shaft 12 is keyed to the driven sleeve 30, which is journalled in bearing housing 31 by bearing assembly 32. The driven sleeve 30 is keyed to the motor block 33, which in turn is journalled to the stator 27 by bearing assembly 34.

Figure 3:
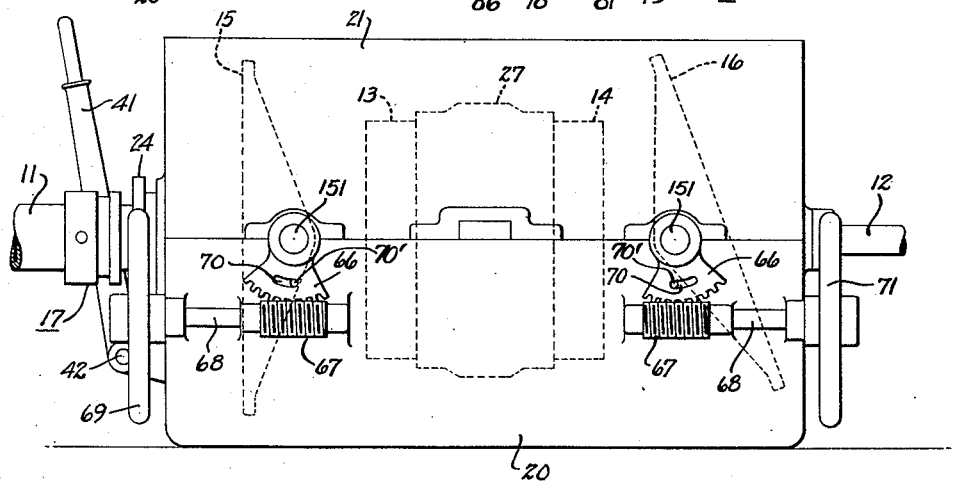
Fig. 3 is a side elevation illustrating diagrammatically the various controls.

The mechanical clutch 17 comprises an adjustable block 35 carrying a pair of pins 36 slidable longitudinally in slots in the drive sleeve 11. The clutch block 35 has dog teeth engaging similar dog teeth on a fixed block 37 pinned to the driven shaft 12. The engagement of the mechanical clutch 17 is controlled by a sleeve 38 secured to the pins 36 and having an annular groove 39 in which rides a stationary boss 40. The boss 40 is secured to hand lever 41 which is pivoted to the body 20 as at 42 (Fig. 3).

The pump block 26 has a plurality of cylinders (six in number in the form shown) and the inner end of this block fits snugly against the end face of the stator 27. A plurality of rings 44 are provided for forming a liquid tight fit between the block 26 and the sleeve-like extension on the stator 27.

Disposed within the cylinders 43 are pistons 45 having the usual piston rings (not shown). Each piston 45 may comprise a body 47 and a removable head 48 forming therebetween a spherical socket for the ball 59 on the end of connecting rod 46. The connecting rod 46 is provided with an oil hole 49 which cooperates with an opening 48' in the piston head 48 for a purpose hereinafter described more in detail.

The forward or pump swash plate 15 comprises a housing 50 having trunnions 51 and 151 seated between the casing body 20 and casing cover 21, so that the swash plate may be tilted as desired. The housing 50 has an annular seat for a ball bearing assembly 52 comprising a plurality of balls separated by the usual spacer. The housing 50 also has an annular holding ring segments 53 bolted thereto to prevent separation of the swash ring 54 from the housing 50.

Rotatably mounted on the housing 50 is the swash ring 54 having an annular seat engaging the ball bearing assembly 52. The swash ring 54 also has an annular flange riding under the holding ring segments 53. It will be understood that in the ordinary operation of the transmission there is practically no engagement between the holding ring segments 53 and the swash ring 54, all of the stress both axially and radially being withstood by the ball bearing assembly 52.

Figure 4:
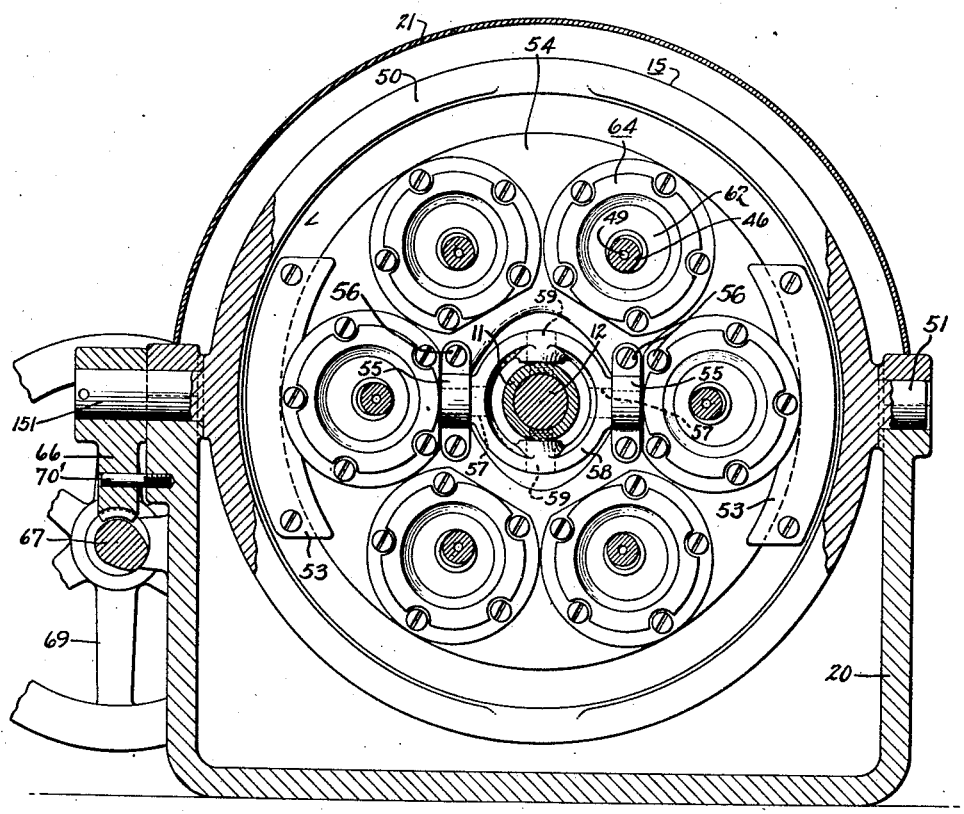
Fig. 4 is a vertical section on the lne 4—4 of Fig. 1.

The swash ring 54 has secured thereto a pair of straps 55 (Fig. 4) by a plurality of bolts 56. The straps 55 support a pair of outer trunnions 57 journalled in ring 58. Ring 58 is journalled on a pair of inner trunnions 59 supported by drive sleeve 11. Thus ring 58 and sets of trunnions 57, 59 form, in effect, a universal mounting for the swash ring 54 on drive sleeve 11, permitting the drive sleeve 11 to drive the swash ring 54 irrespective of the angle of tilt of swash housing 50.

To reduce friction between the connecting rods 46 and the swash ring 54, a "floating" connecting rod arrangement is provided. The swash ring 54 has a plurality of bearing bodies 60 and removable caps 61, one set for each cylinder. Each bearing body 60 and cap 61 forms a socket for a ball 62 secured to the end of a connecting rod 46 by a nut 63, forming connecting rod bearings 64.

The relative size and proportion of each connecting rod bearing 64 is so arranged that the total force exerted by the liquid between the swash ring 54 and the ball 62 is equal to the force exerted by the liquid on the piston 45. It will be noted that the projection area of the space occupied by the liquid, illustrated by 65, on a plane perpendicular to the connecting rod axis is substantially equal to the area of the piston. Thus, mechanical stress exerted between the swash plate 54 and the connecting rods is reduced to a minimum, all of this stress being transmitted by liquid pressure transmitted from the liquid above the piston.

The swash plate 15 is adjusted according to the invention in any desired way. For purposes of illustration, a simple form of hand adjustment is shown. The trunnion 151 has a worm wheel sector 66 which meshes a worm 67 on a worm shaft 68 suitably journalled on the casing body 20. A hand wheel 69 is mounted on the shaft 68 and by the turning of this hand wheel the position of the swash plate 15 may be adjusted. The sector 66 may have a slot 70 receiving a pin 70' secured to the casing body for limiting the extreme positions of the swash plate 15 between erect and full tilt.

The construction of the motor unit 14, including the cylinder block, swash plate and adjusting mechanism is substantially the same as the corresponding parts relating to the pump 13 and hence it is not necessary to describe these parts in detail.

Figure 2:
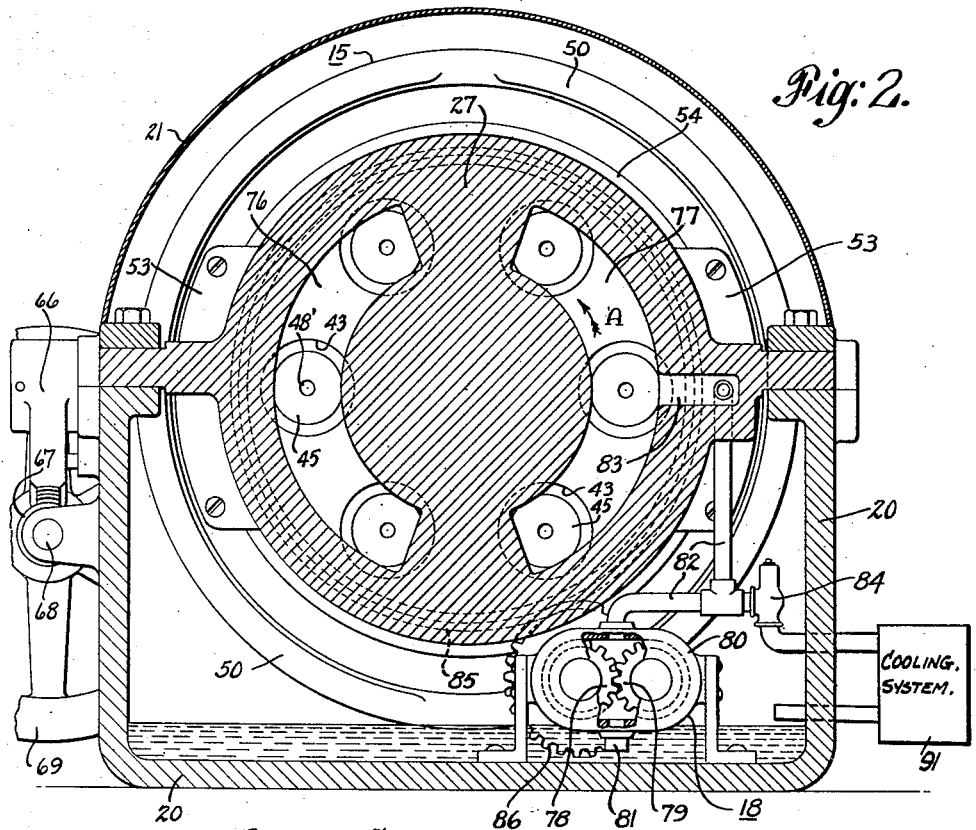
Fig. 2 is a vertical section on the line 2—2 of Fig. 1.

The stator 27 is supported by the casing body 20, as illustrated in Figs. 1 and 2, and snugly receives the cylinder blocks 26 and 33. The threaded adjustable collars 24 and 25 in the bearings 23 and 31 adjust the cylinder blocks 26 and 33 to obtain the desired snug engagement with the transverse faces of the stator 27. The stator 21 is provided with a pair of arcuate openings 76 and 77 (Fig. 2) which are arranged on the line of movement of the centers of the cylinders. A greater space than the diameter of the cylinder is provided between the adjoining ends of these openings.

Assuming that both swash plates are tilted and the transmission is rotating in the direction of the arrow A (Fig. 2), it will be seen that the pistons of the pump unit suck liquid as the cylinders move from the bottom of opening 77 to the top thereof. Thus, this opening in relation to the pump unit is a suction opening, the other opening 76 in relation to the pump unit being a discharge opening.

It will be understood by those skilled in the art that with both swash plates, for example, in full tilt position, the pump receives liquid from the motor through the suction opening 77, compresses this liquid and discharges it through the discharge opening 76, thus driving the motor unit hydraulically. The oil travels through a closed path, never getting out in the casing of the transmission except for leakage.

To prevent the hydraulic liquid, which in practice may be motor oil, from foaming or emulsifying due to air getting entrapped therewith, an auxiliary pump 18 (Fig. 2) is provided. This pump may be an ordinary gear pump comprising a pair of gears 78, 79 rotating within a casing 80 which is bracketed to the body 20 of the main casing. The auxiliary pump 18 has a suction opening 81 for sucking oil from a reservoir formed in the bottom of the casing body 20. This oil is discharged by the pump into discharge pipe 82 which communicates with a discharge passage 83 in the stator 27 communicating with the suction opening 77.

The auxiliary pump 18 thus keeps the suction side of the stator 27 under an appreciable hydraulic head which may be of the order of 30 lbs. although this pressure may be varied through a wide range. A suitable blow-off or safety valve 84 is provided in the discharge pipe 82 for maintaining the pressure of the auxiliary pump 18 at the predetermined amount.

The auxiliary pump 18 may be driven by any suitable source of power, but for purposes of illustration, it is shown as being driven by an annular gear 85 affixed to the pump block 26 and driving a gear 86 mounted on the shaft of pump gear 78.

The point of connection between the auxiliary pump 18 and the suction opening 77 may be located at any point along the length of the suction opening 77, but it is preferred to locate this point about half way between the top and the bottom of the suction opening 77, as illustrated in Fig. 2.

In operation, when the load is stationary, the mechanical clutch 17 will be open and the swash plate 15 will be erect, while the swash plate 16 will be in full tilt position, as illustrated in Fig. 3. Thus, in "neutral" position, even though the drive shaft 11 is rotating the swash ring 54, there is no pumping action of the pump unit 13.

To start the load moving, the hand wheel 69 is operated, gradually tilting the swash plate 15. This causes the pump unit 13 to start pumping oil which drives the motor unit 14 as a motor, driving the driven shaft 12 which drives the load. When the forward swash plate 15 reaches the full tilt position, a one to one speed ratio is obtained between driving and driven shafts. At this point the hand lever 41 may be operated to mechanically engage the clutch 17. Then both hand wheels 69 and 71 may be operated to gradually bring both swash plates 15 and 16 back to erect position together. Thus, in direct drive or "high" there is no piston movement in either the pump or the motor unit of the transmission.

The use of the auxiliary pump or supercharger 18 keeps the closed circulatory system of the transmission supplied or supercharged with high pressure oil, causing all parts of the closed system to be above atmospheric pressure. Thus, not only is any air entrapped with the oil discharged through leakage, but ingress of air, which would occur if operating with the suction side of the pump unit below atmospheric pressure, is also prevented. The exclusion of air prevents all foaming which is especially troublesome when operating the oil at high velocities, as, for example, with both swash plates at full tilt position.

The auxiliary pump or supercharger 18 may also be used for circulating the oil for cooling purposes, if desired. In this case, the discharge from the relief valve 84 would be circulated through a cooling system denoted diagrammatically by 91 before being led back into the reservoir into the bottom of the casing body 20.

Furthermore, the use of the supercharger provides a continual source of supply of oil under pressure, even though the drive of the transmission is direct, for operating auxiliary apparatus, such as, for example, hydraulic cylinders which may be used for operating the swash plates or the mechanical clutch.

A further advantage of the present invention is the absence of a separate flywheel when used with an automobile engine and the easy adaptation of this type of transmission to automatic control either by engine speed or car torque, or by both of these factors.

While certain novel features of the invention have been disclosed and are pointed out in the annexed claims, it will be understood that various omissions, substitutions and changes may be made by those skilled in the art without departing from the spirit of the invention.

What is claimed is:

1. In a variable stroke swash plate engine, a shaft, a cylinder block mounted on said shaft and having a plurality of axially extending cylinders, pistons in said cylinders, a tiltable swash plate housing, a swash ring journalled on said housing and having a plurality of socket members, one for each cylinder, hollow connecting rods, each having a swash ring ball at one end and a piston ball at the other end, said pistons having sockets for said piston balls, said swash ring ball being hollow and having an end face cut on a plane perpendicular to the axis of the connecting rod, said face having an effective area equal to the area of its cooperating piston, whereby the fluid pressure in the cylinder is communicated to said swash ring bearing so that the total force exerted by the liquid between said swash ring and connecting rod is substantially the same as the total force of the liquid on the piston.

2. In a variable stroke swash plate machine, a plurality of circularly arranged cylinders, pistons in said cylinders, a tiltable swash plate support, a swash plate journalled on said support and having a plurality of socket members, one for each cylinder, connecting rods each having a ball at one end for its respective socket member, each connecting rod having a pivot connection at its other end with its respective piston, said balls each being cut to form a clearance space uniformly open at the bottom of its respective socket member to hold a body of fluid under pressure, means for connecting each said clearance space with the pressure side of its respective piston, said space having an effective area substantially equal to the area of its cooperating piston, and means on said socket members holding said balls in assembled relation.

3. In a machine, a cylinder, a piston in said cylinder, a power transmitting member having a socket, said socket comprising a body member and a removable cap member, a ball in said socket positively held against displacement and having a segment cut from the end thereof and forming with said socket a fluid bearing space at the bottom of the socket, liquid in said space, a connecting rod connecting said ball and piston, and means for connecting the pressure side of said piston and said bearing space, said bearing space having an effective area substantially equal to the area of its cooperating piston.

4. In a swash plate machine, a plurality of circularly arranged cylinders, pistons in said cylinders, a swash plate comprising a rotary member and a non-rotary member journalled one on the other, one of said swash plate members having a plurality of socket members, one for each cylinder, hollow connecting rods, each having a swash plate ball at one end and a piston ball at the other end, said pistons having sockets for said piston balls, said swash plate ball being hollow and having an end face cut on a plane perpendicular to the axis of the connecting rod, said face having an effective area equal to the area of its cooperating piston, whereby the fluid pressure in the cylinder is communicated to said swash plate bearing so that the total force exerted by the liquid between said swash plate and connecting rod is substantially the same as the total force of the liquid on the piston, and means on said swash plate socket member for positively holding said swash plate balls in engagement therewith.

5. In a swash plate machine, a plurality of circularly arranged cylinders, pistons in said cylinders, a swash plate comprising a rotary element and a non-rotary element journalled one on the other, a plurality of connecting rods, one for each cylinder, each connecting rod having a bearing with its respective piston, a plurality of ball and socket connections between said connecting rods and one of said swash plate elements, each said connection comprising a ball member and a socket member, one member of each ball and socket connection being cut to form a uniformly open clearance space at the bottom of its socket member to hold a body of fluid under pressure, means for connecting said clearance spaces with the pressure side of their respective pistons, said spaces having an effective area substantially equal to the area of their cooperating pistons, said socket members covering more than half the spherical surface of said ball members to prevent accidental disassembly of said ball and socket members.

DAVID S. BENNETCH.